United States Patent [19]

Matschinsky

[11] 3,952,824

[45] Apr. 27, 1976

[54] RIGID REAR AXLE FOR MOTOR VEHICLES

[75] Inventor: Wolfgang Matschinsky, Munich, Germany

[73] Assignee: Bayerische Motoren Werke Aktiengesellschaft, Germany

[22] Filed: Apr. 10, 1974

[21] Appl. No.: 459,799

[30] Foreign Application Priority Data

Apr. 11, 1973 Germany.......................... 2318231

[52] U.S. Cl................................ 180/73 D; 280/724
[51] Int. Cl.²........................................... B60G 7/02
[58] Field of Search................. 180/73 R, 71, 73 C, 180/73 D; 280/124 R

[56] References Cited
UNITED STATES PATENTS

| | | | |
|---|---|---|---|
| 1,919,033 | 7/1933 | Noble | 180/73 R |
| 2,746,766 | 5/1956 | Nallinger | 280/124 R |
| 3,174,771 | 3/1965 | Muller | 180/124 R |
| 3,193,303 | 7/1965 | Allison et al. | 180/73 R |

FOREIGN PATENTS OR APPLICATIONS 1,530,575  10/1969  Germany.......................... 180/73 R OTHER PUBLICATIONS
"ATZ" Automobiltechnische Zeitschrift 1/1968 70 Jahrgang Nr. 1.

*Primary Examiner*—M. H. Wood, Jr.
*Assistant Examiner*—J. D. Rubenstein
*Attorney, Agent, or Firm*—Craig & Antonelli

[57] ABSTRACT

A rigid rear axle for motor vehicles, especially for passenger motor vehicles, whose wheels are driven by way of drive shafts from a rear axle gear supported at a frame or the like; the axle member is thereby suspended by a vehicle part such as the frame or the like on four guide members arranged approximately at an angle of 45° to the driving direction as viewed in plan view; all four guide members are of approximately equal length, of which the two lower ones point forwardly and the two upper ones point rearwardly; the points of pivotal connection of the four guide members at the axle member are disposed approximately one above the other outwardly in proximity of the wheel whereby the line of connection of the points of intersection of the upper and of the lower guide members, respectively, as viewed in side view, are arranged horizontally or sloping down forwardly and at least the upper guide members are arranged sloping down rearwardly.

23 Claims, 5 Drawing Figures

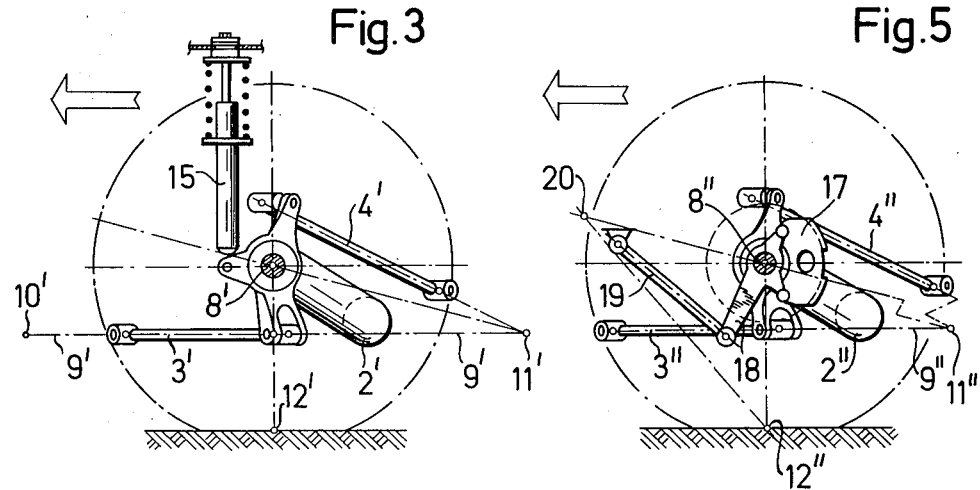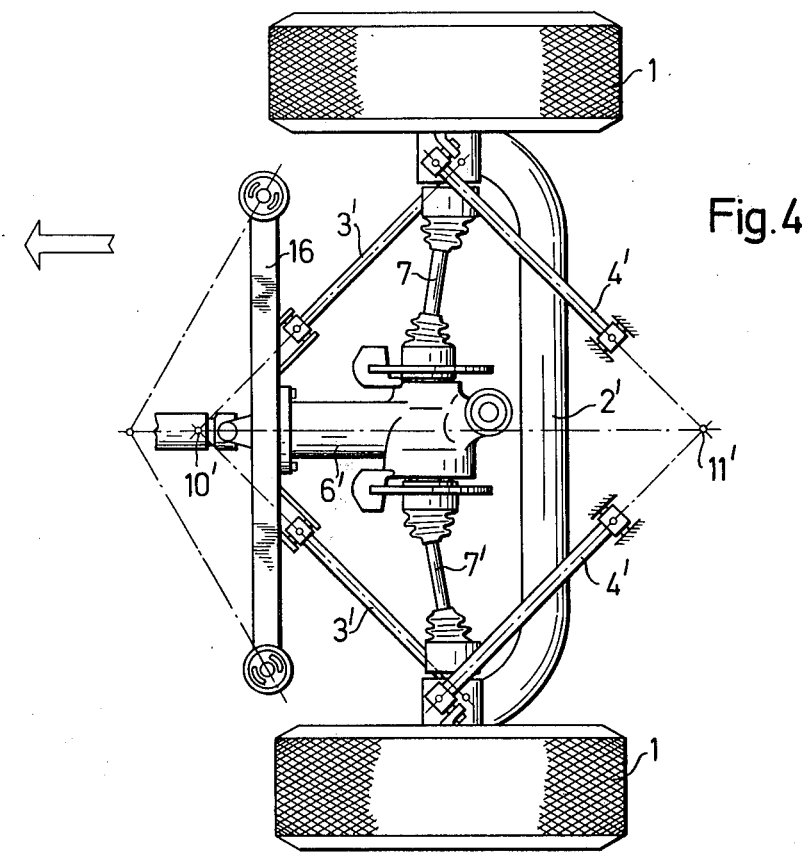

RIGID REAR AXLE FOR MOTOR VEHICLES

The present invention relates to a rigid rear axle for motor vehicles, especially for passenger motor vehicles whose wheels are driven from a rear axle gear supported at a chassis frame or at an auxiliary frame by way of drive shafts with length compensation (so-called "De-Dion axles").

Rear axle suspensions are known in which the axle body of the rigid axle is guided by longitudinal guide members whereby the transverse support takes place by way of a transverse guide member, a triangular guide member or a so-called "Watt-linkage."

In high-powered vehicles, it is desirable to reduce or prevent the dipping of the vehicle rear section during starting or acceleration because this impairs the comfort, especially of the passengers seated in the rear of the vehicle; this means, one aims at a so-called "starting pitch compensation." A starting-pitch compensation can be obtained with axles of the aforementioned type in which the wheels are driven from a rear axle gear supported at a chassis frame by way of drive shafts, in that one so constructs the suspension of the axle that the wheel centers during inward spring movements are simultaneously displaced toward the rear as viewed in side view.

If with an axle suspension of the aforementioned type, longitudinal guide members, i.e., guide members extending in plan view in the driving direction are used, then they have to be arranged rising forwardly in order that the aforementioned effect of the displacement of the wheel centers toward the rear occurs during the inward spring deflection. However, such a suspension has as a consequence that in a curve, when one wheel spring deflects inwardly relative to the body and the other wheel spring deflects outwardly, the axle assumes an inclined position in plan view, and more particularly in such a manner that it reduces the radius of curvature desired by the driver (so-called "over-steering"), from which results a considerable impairment of the driving behavior.

The present invention is therefore concerned with the task to provide a rigid rear axle of the aforementioned type in which the dipping of the vehicle rear section during the starting and accelerations is prevented without the occurrence of an oversteering inclination of the axle when driving through a curve, whereby furthermore attention should be paid to the fact that no undesirably strong outward spring deflection takes place during the braking.

As solution to the underlying problems, it is proposed according to the present invention that with a rigid rear axle whose wheels are driven by way of drive shafts from a rear axle gear supported at a frame, chassis or the like, the axle member is suspended at the vehicle frame, chassis or the like on four guide members arranged approximately at an angle of 45° to the driving direction as viewed in plan view, which are all four of approximately equal length, and of which two lower guide members point forwardly and two upper guide members point rearwardly, whereby the points of pivotal connection of the four guide members at the axle member are disposed in pairs approximately one above the other outwardly in proximity of the respective wheels, whereby additionally the connecting line of the points of intersection of the upper guide members and of the lower guide members, respectively, is arranged horizontally as viewed in side view or sloping down forwardly and whereby at least the upper guide members are arranged sloping down rearwardly.

The advantages of this suspension of a rigid rear axle of the aforementioned type reside in that the dipping of the vehicle rear section is reduced or even prevented during the starting or accelerations without the occurrence of an oversteering inclination of the axle when driving through a curve, whereby additionally the outward spring deflection during braking is reduced in a favorable manner.

These and further objects, features and advantages of the present invention will become more apparent from the following description when taken in connection with the accompanying drawing which shows, for purposes of illustration only, several embodiments in accordance with the present invention and wherein:

FIG. 3 is a side elevational view of a modified embodiment of a rigid rear axle in accordance with the present invention;

FIG. 4 is a top plan view of the rigid rear axle of FIG. 3; and

FIG. 5 is a side elevational view of a still further modified embodiment of a rigid rear axle in accordance with the present invention.

Figures 1, 2:
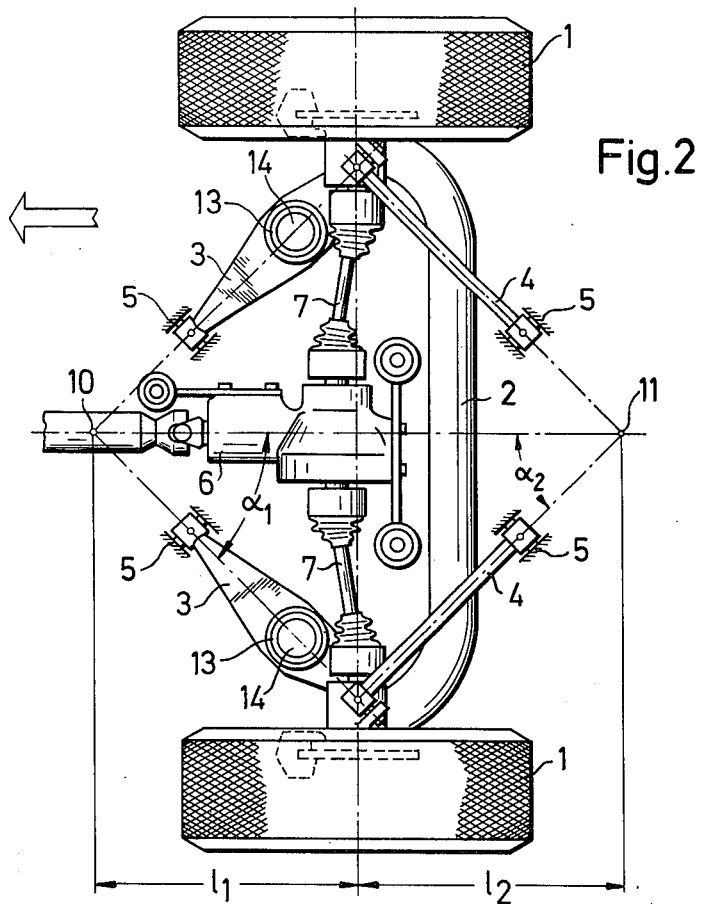
FIG. 1 is a side elevational view of a first embodiment of a rigid rear axle in accordance with the present invention.
FIG. 2 is a top plan view of the rigid rear axle of FIG. 1.

Referring now to the drawing wherein like reference numerals are used throughout the various views to designate like parts, the wheels in FIGS. 1 and 2 are supported at an axle body or member 2 which is pivotally supported at the vehicle frame 5 or the like by way of two lower guide members 3 which point forwardly and by way of two upper guide members 4 which point rearwardly. The rear axle gear 6 is supported at the vehicle frame, chassis or the like and drives the wheels 1 by way of drive shafts 7. Since the present invention is applicable to constructions in which the guide members 3, 4 and axle gear 6 are supported at the frame of the vehicle, at the chassis-frame, at relatively fixed parts of a self-supporting vehicle body or at an auxiliary frame, the latter are indicated only schematically in the drawing and will be referred to hereinafter and in the claims as relatively fixed parts. The lower guide members 3 and the upper guide members 4 are approximately of equal length and are inclined in plan view (FIG. 2) approximately at an angle of 45° to the driving direction. In side view (FIG. 1), the upper guide members 4 slope down toward the rear while the lower guide members 3 rise in the forward direction and are disposed parallel to the upper guide members 4. During the inward and outward spring deflections, the axle member 2 is guided in side view in the manner of a "Watt linkage" whereby the wheel center 8 disposed between the points of pivotal connection of the upper and of the lower guide members is displaced approximately perpendicularly to the guide members 3 and 4, i.e., during inward spring deflection at the same time at an inclination rearwardly, whence the reduction of the dipping of the vehicle rear section during the starting or accelerations is achieved. When driving through a curve, the axle member 2 together with the wheels 1 rotates relative to the body about the connecting line 9 of the points of intersection 10 and 11 of the lower guide members 3 and of the upper guide members 4, respectively. If this line 9 is horizontal, then no inclination of the axle member 2 occurs in plan view ("neutral" behavior) when driving through a curve. In the embodiment according to FIG. 1, the line 9, however, slightly slopes down forwardly, whereby even an often desirable "understeering" behavior during curve drives is achieved. The point of intersection (pole) of the upper and of the lower guide members in side view is at infinity in FIG. 1. The connecting line from the point of contact 12 of the wheel with the ground to this pole therefore extends rising forwardly, and more particularly parallel to the guide members, from which results a reduction of the outward spring deflection during braking.

In FIGS. 1 and 2, springs 13 and shock absorbers 14 are supported at the lower guide members 3 whereby the space requirements of the axle aggregate, especially with respect to the luggage space, is reduced. A further advantage of the axle suspension according to the present invention resides in that during inward spring deflections a pivot movement of the axle member 2 takes place, as viewed in side view, by means of which the portion of the axle member extending toward the rear of the rear axle gear 6 carries out a lesser vertical movement than the wheel center 8, which means again less space requirement under the luggage space.

If the joints of the upper and of the lower guide members are made of elastic material, they are deformed under the influence of the forces occurring during the vehicle driving operation. It has to be prevented thereby that the upper guide members 4 supporting the axle in the rear vehicle area, yield more strongly under the influence of a side force at the wheels than the lower guide members 3 because in that case the axle member 2 would assume an "oversteering" inclined position when driving through curves. If $c_1$ and $c_2$ are the resulting spring rates of the lower and of the upper guide members, $\alpha_1$ and $\alpha_2$ the angles thereof with respect to the driving direction in plan view, and $l_1$ and $l_2$ the distances of the points of intersection 10 and 11 of the lower and of the upper guide members from the wheel center axis in plan view (Fig. 2), then an elastic "oversteering" of the axle in the presence of a side force is avoided if the following equation is fulfilled:

$$l_1 \cdot c_1 \cdot \sin^2\alpha_1 \leq l_2 \cdot c_2 \cdot \sin^2\alpha_2$$

FIGS. 3 and 4 illustrate a further embodiment of the present invention in side and top plan view. In this embodiment, the upper guide members 4' are arranged sloping down toward the rear, as viewed in side view, while the lower guide members 3' are arranged horizontally; the point of intersection 11' of the upper guide members 4' lies at the same height as the lower guide members 3' and the point of intersection 10' thereof, whence also the connecting line 9' of these points is disposed horizontally, which results in a "neutral" steering behavior when driving through a curve. The point 11' is thereby also simultaneously pole for the movement of the axle member in side view. During an inward spring deflection, the wheel center 8' moves perpendicularly to its connecting line with the pole 11', i.e., at an inclination toward the rear, whereby the conditions for a reduced dipping of the vehicle rear section during accelerations are fulfilled. The connecting line from the point of contact 12' of the wheel with the ground with respect to the pole 11', however, rises rearwardly, which would produce a strong outward spring deflection during braking if the brakes were to be mounted at the wheels. For this reason, the axle suspension according to FIG. 3 is particularly well suited if the brakes, as is illustrated in FIG. 4, are secured at the rear axle gear 6' and act on the wheels by way of the drive shaft 7'.

A spring leg 15 formed of shock absorber and spring is used for the spring support in FIG. 3, which in the illustrated embodiment is pivotally connected directly at the axle member 2', and more particularly in front of the wheel center 8', from which results a progressive spring characteristic in connection with the axle suspension according to the present invention.

It is additionally illustrated in FIG. 4 that in particular the lower guide members 3' may be supported at an auxiliary frame 16 for the better noise insulation with respect to the passenger space; the auxiliary frame 16 is thereby again elastically suspended at the vehicle frame or the like. Also, the upper guide members 4' may be supported at an auxiliary frame; furthermore, it is within the scope of the present invention that all four guide members and possibly also the rear axle gear are all supported at an auxiliary frame. Similar modifications are also feasible in connection with the other described embodiments of the present invention.

If in a suspension according to FIGS. 3 and 4, the brakes are to be mounted at the wheels, then measures have to be taken in order to avoid an excessive outward spring deflection during braking. FIG. 5 illustrates an axle suspension similar to FIG. 3, whereby the brake anchoring plates or the brake saddles 17 of the brakes mounted at the wheels are secured at brake mounting supports 18 which are rotatably supported at the axle member 2" concentrically to the wheel center 8". These brake mounting supports 18 are pivotally connected with the vehicle frame or the like by way of one further guide member 19 each in such a manner that the connecting line from the point of contact 12" of the wheel with the ground with respect to the pole 20, which results as point of intersection of the guide member 19 and of the connecting line 9 from the wheel center 8" to the pole 11', rises forwardly whereby the outward spring deflection during braking is avoided.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A rear axle assembly for motor vehicles comprising:
    rear axle gear means for driving wheels of a vehicle by way of drive shafts, said rear axle gear means being supported by a fixed vehicle parts,
    an axle member supporting said wheels, said axle member being capable of substantial vertical movement relative to said rear axle gear means, and
    guide means for suspending said axle member from fixed vehicle parts, said guide means including four guide members of approximately the same length, each of said four guide members being arranged approximately at an angle of 45° to the driving direction as viewed in plan view, wherein said four guide members include two lower guide members extending forwardly and two upper guide members extending rearwardly, each of said four guide members being pivotally connected at one end to the axle member in proximity to a respective wheel with the points of pivotal connection of a respective upper guide member and lower guide member being disposed approximately one above the other, and the respective forward and rearward points, formed by the intersection of lines extending parallel to the longitudinal dimension of each of said two lower guide members and each of said two upper guide members, defining a connecting line being arranged such that the forward point of intersection is at most at the height of the rearward point of intersection, and wherein at least said two upper guide members are arranged sloping down rearwardly, as viewed in side view.

2. A rigid rear axle according to claim 1, characterized in that the connecting line of the points of intersection of the upper guide members and of the lower guide members is arranged at least approximately horizontally, as viewed in side view.

3. A rigid rear axle according to claim 1, characterized in that the connecting line of the points of intersection of the upper guide members and of the lower guide members is arranged sloping down forwardly, as viewed in side view.

4. A rigid rear axle according to claim 1, characterized in that the lower guide members and the upper guide members extend approximately parallel to one another, as viewed in side view.

5. A rigid rear axle according to claim 4, characterized in that the connecting line of the points of intersection of the upper guide members and of the lower guide members is arranged sloping down forwardly, as viewed in side view.

6. A rigid rear axle according to claim 4, characterized in that the connecting line of the points of intersection of the upper guide members and of the lower guide members is arranged at least approximately horizontally as viewed in side view.

7. A rigid rear axle according to claim 1, characterized in that the lower guide members extend approximately horizontally as viewed in side view of the vehicle.

8. A rigid rear axle according to claim 7, characterized in that spring and shock absorber members engage at the lower guide members.

9. A rigid rear axle according to claim 7, characterized in that spring leg means formed of a shock absorber and a spring engage at the lower guide members.

10. A rigid rear axle according to claim 7, characterized in that a spring leg is pivotally connected at the axle member.

11. A rigid rear axle according to claim 7, characterized in that with brake means mounted at the wheel, parts of the brake means are secured at brake mounting means which are rotatably supported at the axle member substantially concentrically to the wheel center, the brake mounting means being pivotally connected at the fixed vehicle part by way of further guide means in such a manner that a second connecting line from the point of contact of the wheel with the ground to the point of intersection of the further guide means with a third connecting line between the wheel center and a point of intersection of the lower guide members and of the upper guide members, extends rising forwardly as viewed in side view.

12. A rigid rear axle according to claim 11, characterized in that the brake parts are brake anchor plates.

13. A rigid rear axle according to claim 11, characterized in that the brake parts are brake saddles.

14. A rigid rear axle according to claim 11, characterized in that the resulting spring rates $c_1$ of the lower guide members and $c_2$ of the upper guide members, the angle of inclination $\alpha_1$ of the lower guide members and $\alpha_2$ of the upper guide members and the distance $l_1$ of the point of intersection of the lower guide members from the wheel center axis and the distance $l_2$ of the point of intersection of the upper guide members from the wheel center axis, as measured in the driving direction, are so selected that the following equation is fulfilled:

$$l_1 \cdot c_1 \cdot \sin^2\alpha_1 \leq l_2 \cdot c_2 \cdot \sin^2\alpha_2.$$

15. A rigid rear axle according to claim 14, characterized in that the drive shafts include length-compensating means.

16. A rigid rear axle according to claim 14, characterized in that the lower guide members and the upper guide members extend approximately parallel to one another, as viewed in side view.

17. A rigid rear axle according to claim 1, characterized in that spring and shock absorber members engage at the lower guide members.

18. A rigid rear axle according to claim 1, characterized in that spring leg means formed of a shock absorber and a spring engage at the lower guide members.

19. A rigid rear axle according to claim 1, characterized in that a spring leg is pivotally connected at the axle member.

20. A rigid rear axle according to claim 1, characterized in that with brake means mounted at the wheel, parts of the brake means are secured at brake mounting means which are rotatably supported at the axle member substantially concentrically to the wheel center, the brake mounting means being pivotally connected at the fixed vehicle part by way of further guide means in such a manner that a second connecting line from the point of contact of the wheel with the ground to the point of intersection of the further guide means with a third connecting line between the wheel center and a point of intersection of the lower guide members and of the upper guide members, extends rising forwardly as viewed in side view.

21. A rigid rear axle according to claim 20, characterized in that the brake parts are brake anchor plates.

22. A rigid rear axle according to claim 20, characterized in that the brake parts are brake saddles.

23. A rigid rear axle according to claim 1, characterized in that the resulting spring rates $c_1$ of the lower guide members and $c_2$ of the upper guide members, the angle of inclination $\alpha_1$ of the lower guide members and $\alpha_2$ of the upper guide members and the distance $l_1$ of the point of intersection of the lower guide members from the wheel center axis and the distance $l_2$ of the point of intersection of the upper guide members from the wheel center axis, as measured in the driving direction, are so selected that the following equation is fulfilled:

$$l_1 \cdot c_1 \cdot \sin^2\alpha_1 \leq l_2 \cdot c_2 \cdot \sin^2\alpha_2.$$

* * * * *